United States Patent
Rankin

[15] 3,688,090
[45] Aug. 29, 1972

[54] RANDOM NUMBER GENERATOR
[72] Inventor: Bayard Rankin, 2853 Coleridge Rd., Cleveland Heights, Ohio 44118
[22] Filed: Oct. 20, 1969
[21] Appl. No.: 867,958

Related U.S. Application Data

[63] Continuation of Ser. No. 365,626, May 7, 1964.

[52] U.S. Cl. ............................................. 235/20 R
[51] Int. Cl. ............................................. G06g 1/02
[58] Field of Search ............ 235/70, 70 A, 70 B, 70 C

[56] References Cited

UNITED STATES PATENTS 1,834,745   12/1931   Shifner ....................... 235/70
2,424,713   7/1947    Seidman ..................... 235/70

FOREIGN PATENTS OR APPLICATIONS 460,655   6/1928   Germany ................. 235/70 A

OTHER PUBLICATIONS

Stibitz & Larrivee, Mathematics & Computers McGraw-Hill, 1957, pp. 188–191

Primary Examiner—Richard B. Wilkinson
Assistant Examiner—Stanley A. Wal
Attorney—Williams, David, Hoffman, Yount & Tarolli

[57] ABSTRACT

A random number generator having measuring means operable to measure and store an arbitrary measurable first quantity, means for ascertaining a second quantity which is a function of the first quantity and partitioning means for partitioning the second quantity into integral parts plus a remainder, and wherein the remainder is measured by the measuring means to determine a new second quantity to be partitioned. This operation is repeated a predetermined number of times to produce as an end result a quantity which is entirely determined by chance.

11 Claims, 5 Drawing Figures 3,688,090

INVENTOR.
BAYARD RANKIN
BY Williams, David Hoffmann & Yount
ATTORNEYS

FIG. 5

RANDOM NUMBER GENERATOR

This is a continuation of application, Ser. No. 365,626, filed May 7, 1964.

This invention relates generally to random number generators, and more particularly to a system for iteratively generating random numbers.

Heretofore many different types of structures and apparatuses have been proposed for the generation of random numbers. These prior art devices can be classified into two large groups: A first group comprised of measuring devices whereby irregular patterns in natural phenomena can be measured and recorded in the form of numbers; and a second group comprised of computing machines whereby the solutions of certain mathematical algorithms that display erratic behavior can be transformed into numbers. Typical objects of measurement for the devices of the first group are phenomena such as thermal motion of electrons in a resistor, variation in electron emission from a heated cathode, Brownian motion of microscopic particles suspended in a fluid, arrival times of cosmic rays, outcomes in games of chance, and so forth. Devices that have been designed expressly to measure such natural phenomena have taken on the form of electronic amplifiers, microscopes, Geiger counters, and electromechanical devices. Computing machines that are typical of the second group of devices, have generally been of the form of large general purpose high-speed digital computing machines. Such computers are capable of solving number theoretic and analytic algorithms while handling many digits and repeating many thousands of calculations. On occasion a combination of a device that measures some random phenomenon and a computing machine has been used to produce random numbers, as for example in the production of tables of random numbers.

A large class of electronic devices described as random signal generators or noise generators could be used as random number generators, though their function is more directly to produce an erratic signal continuously evolving in time. Random signal generators or noise generators are classified as measuring devices with the first group of random number generating devices, because they sense a physical electronic source of randomness and amplify this source with an electronic amplifier. A sampling of the continuously emitted output of these devices at discrete points in time will produce a sequence of random numbers.

The purposes of using measuring or computing devices to produce random numbers are many. Random numbers can be used for purposes of scientific analysis to simulate the tosses of a coin, the rolling of a die, the occurrences of automobile accidents, the births and deaths of individuals in a population, and whatever physical phenomenon has a statistical description. That is, they can be used to produce under controlled conditions various numbers in the same proportions and in the same unpredictable manner that are observed in nature. From the calculational point of view, random numbers can be used to randomize experiments in the laboratory (eliminating observational bias), to insure random sampling in statistical surveys (in population studies, census taking, forestation, etc.), to test statistical methods under controlled conditions, to effect Monte Carlo calculations, to provide the randomizing element in any industrial quality control procedure, and to aid in the performance of many other mathematical tasks. From the pedagogic point of view, random numbers can be used to acquaint the student in the class room and in his study with the kinds of raw data with which probability theory and statistical analysis concerns itself.

Accordingly, for a variety of purposes a random number generator is needed. By use of a random number generator, the human element is totally eliminated and substituted therefor is the electronic, electrical, mechanical, or electromechanical structure elements of the random number generator, itself. However, it should be appreciated that either of the two general types of prior art random number generating devices, namely measuring devices and computing machines, have either highly complicating features or practical limitations. Characteristic of the class of measuring devices used in the generation of random numbers, the error of measurement is very small, a necessity in the sophisticated devices used for detection of small quantities. For example, if electronic devices are used, large amplification is essential. If optical, or other physical apparatus are used for measurement, great magnification in some form is necessary. Also characteristic of measuring devices is a tendency for the results, when they are transformed into random numbers, to depend on the physical characteristics of the phenomenon being studied. This characteristic is even true of games of chance, which in reality derive their random behavior from a measurement process. Dependences on an underlying phenomenon are minimized in games of chance by shuffling, mixing, and the like, but become apparent when the physical mechanism on which the source of chance depends begins to age and to change its physical structure.

Characteristic of the class of computing machines that have been used in the generation of random numbers, it is a fact that the numbers they produce (frequently called "pseudo-random" numbers) fall short of some of the properties of randomness, if used too extensively. Generally, in order to avoid deviations from true randomness, large computing machines are essential as the computing device, due to the large number of digits that must be handled at one time for effective computation. It is also typical of the methods that have been developed for the generation of random numbers by computation that these methods are adapted for digital, as contrasted to analogue, computing machines.

In summary, by whatever means in the prior art random numbers are generated, either highly complicated or delicate structures are required, or else the numbers that are generated are evidently dependent on periodicities of some physical phenomenon or are pseudo-random in character. It is with the intention to avoid any inherent bias in the random number generator and to develop a truely random number generating system of simple character that this invention is dedicated.

It is the purpose of this invention to generate random numbers by a system involving a precision measuring device, which utilizes the inherent errors of the measuring device itself.

It is a further object of this invention to provide a random number generator by a process of repeated measurement, such that the effectiveness of the generator does not depend on measurement of any phenomenon with random properties.

It is still another object of this invention to generate random numbers by measuring with a precision measuring device a predetermined function of previous measurement readings that are obtained with the same precision measuring device.

It is yet a further object of this invention to provide a random number generator which starts with an arbitrary measurable quantity and after a series of measurements, whose number is dependent upon the accuracy of the measurement device used, will result in a number whose digital structure is determined by chance and is independent of the original measurable quantity.

It is still another object of this invention to provide a random number generator which is of simple design and construction.

It is still another object of this invention to provide an inexpensive random number generator.

It is yet a further object of this invention to provide a random number generator whose accuracy and sensitivity is not strongly time dependent upon the durability of the physical parts.

A better understanding of the invention and its versatility will be had by reference to the accompanying drawings in which.

Figure 1:
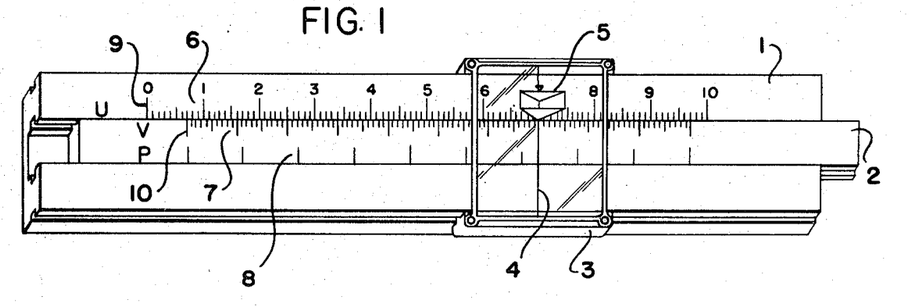
FIG. 1 is a perspective view of a slide rule which is equipped with an optical vernier interpolator contained in the reading glass of the cursor and which is equipped with appropriate scales so that the slide rule can generate random numbers.

Referring first to FIG. 1, there is shown a slide rule whose construction is of the Mannheim type, though its scales are not of the familiar logarithmic form. It is composed basically of two relatively slidable members and a cursor. The two relatively slidable members 1 and 2 each have one or more scales inscribed on an outer surface thereof. The first relatively slidable member 1 comprises the body of the slide rule and the second relatively slidable member 2 comprises the slide of the slide rule. The cursor 3 can be moved relative to the body and the slide and is inscribed with a central hairline 4 running transverse across the slide rule. The reading glass of the cursor is ground in a central position, so as to provide a double prism form of optical vernier interpolator 5. The design and use of the optical vernier interpolator 5 is described in detail in my copending application, Ser. No. 3,65,629 now U.S. Pat. No. 3,449,052.

The main functions which are to be performed by the slide rule embodiment are the storing of a length between zero and one unit, the measurement of this length and storing of a measurement reading in the form of a multiple of this length, and a partitioning of the stored measurement reading into integral parts of unit magnitude plus a fractional part and the storing of the fractional part in the form of a new length between zero and one unit. Once the slide rule is capable of these basic functions, an iteration of them will result in a succession of measurements of a predetermined function of previous measurements, whereby a reading entirely determined by chance will be obtained. In greater detail, with the use of the inscribed scales and the optical vernier interpolator of the cursor, the slide rule is designed to store a length between zero and one unit in the form of a displacement of the slide 2 relative to the body 1, to measure this length precisely and store the measurement reading in the form of a setting of the cursor 3 on the slide rule body 1 that records 10 times the said displacement, and to partition the stored measurement reading into integral parts of unit magnitude plus a fractional part, and finally to store the fractional part as a new displacement between slide and body.

To carry out the above desired ends, a linear scale 6, called the U-scale, is provided on the surface of the body 1. It is on the U-scale 6 that results of the calculations in the form of a uniform distribution of random numbers will be read. The U-scale is inscribed along an edge immediately adjacent to the slide. It has an initial zero marker 9 and ten equal divisions each graduated into ten equal parts. The scale markers of the U-scale 6 that indicate the major division points are long and are labeled with integer values from 0 to 10. The slide 2 is provided with two scales, 7 and 8, on its surface, called the V-scale and the P-scale, respectively. The V-scale 7 is a vernier scale and the P-scale 8 is used in the partitioning operation that returns the slide 2 to a new displacement position. The V-scale 7 is inscribed along the edge of the slide 2 that is adjacent to the U-scale 6. Like the latter, against which it is read, the V-scale 7 has ten equal divisions each graduated into 10 equal parts, though unlike the U-scale 6 its scale markings are spacially removed from each other a distance equal to nine-tenth the space interval between successive markings in the U-scale 6. The V-scale 7 extends nine-tenth the total length of the U-scale 6 and is so positioned on the slide 2 that, when the slide is retracted with ends coinciding with the ends of the body, the zero marker 10 of the V-scale 7 coincides with the zero marker 9 of the U-scale 6. The P-scale 8 is inscribed on the slide along the alternate edge of the slide from the V-scale. It is composed of 10 equally spaced marks, the first of which is inscribed at the same longitudinal position as the beginning of the V-scale 7 and the last of which is inscribed at the same longitudinal position as the end of the V-scale 7.

As a result of the interrelationship of the inscribed scales and of the magnification properties of the optical vernier interpolator 5, it is possible, with the zero marker 10 of the V-scale 7 displaced at some fixed position between the markers labeled 0 and 1 on the U-scale 6, to set the cursor so that, with small unbiased error, its hairline is displaced from the zero marker 9 of the U-scale 6 10 times further than the zero marker 10 of the V-scale 7. For example, if the displacement of the zero marker 10 is read 0.71 on the U-scale 6, the major scale marker on the U-scale 6 that most nearly coincides with a major scale marker on the V-scale 7 is read 7.00 and the subdivisional scale marker, within the range 7.00 to 8.00 on the U-scale 6, that most nearly coincides with a scale marker on the V-scale 7 is read 7.10. Thus, by sliding the cursor along the body until its hairline is in the neighborhood of the position 7.10 on the U-scale, the position of the hairline is 10 times further along the U-scale than is the zero marker 10 of the V-scale 7. By using the optical properties of the vernier interpolator 5, an exact position can be obtained for the hairline, even though that position does not, as in this example, coincide with a scale marker on the U-scale. Also as a result of the interrelationship of the inscribed scales and the position of the hairline on the cursor, it is possible, with the cursor 3 held fixed relative to the body 1, to partition the ladder reading of 7.10 into seven parts of unit length plus a fractional part of length 0.10. Such a partitioning operation is accomplished simply by moving the slide 2 until one of the scale markers on the P-scale 8 is drawn to coincide with the hairline 4. After such an operation, the zero marker of the V-scale 7 as read against the U-scale 6 is at position 0.10. Where a choice of markings on the P-scale to be drawn in coincidence with the hairline 4 is presented, that one is to be used which keeps the zero mark of the V-scale 7 within the first one unit interval of the U-scale 6.

The zero mark of the V-scale is preferably kept within the first unit interval of the U-scale because it would be possible under certain circumstances to establish a subsequent quantity, that is the quantity after the next amplification, which would be off the V-scale. If the zero mark of the V-scale is kept within the interval of the U-scale, this will not happen when operating the slide rule disclosed.

The characteristics of measurement error would suggest that, while these basic operations of the slide rule embodiment involve a precision measurement, the partitioning operation discards the most significant part of any measurement and leaves that part most subject to error. Thus, the iteration of measuring and partitioning in alternation must result in a quantity, in this case length, determined solely by chance. The incorporation of the precision measurement operation is essential to eliminate the possibility of bias and to remove the characteristics of the operator and the physical make-up of the mechanism, itself, from the results. The incorporation of the partitioning operation is essential to separate out the small random components from the measurements as rapidly as possible.

There is both a mathematical and a physical basis for the generation of random numbers by an iteration of the operation of measurement followed by a partitioning operation. The mathematical basis is expressible in its simplest form by assuming that the physical measurement operation can be made exact and devoid of error. With this premise, it is still possible to prove, under reasonable assumptions, that the iteration method could produce pseudo-random numbers. Under the assumption that the measurement operation is devoid of error, precision measurement is essentially a mathematical operation of multiplication, and one can treat the measuring device as an ideal computer of the analogue variety that has no error.

The mathematical basis referred to is expressed by a theorem which says that "almost all" numbers between 0 and 1 (For a definition of the term "almost all", which is well known to mathematicans, see Introduction to Measure and Integration by M. E. Munroe, published by Addison-Wesely Publishing Company, Inc., Cambridge, Mass.) can be used as the basis from which an infinite sequence of randomlike numbers may be generated. One generation process sufficient for the theorem to be true is defined by the formula (see Statistical Independence In Probability, Analysis and Number Theory, by Mark Kae, 1959, published by The Mathematical Association of America, distributed by John Wiley and Sons, Inc.):

$$a_{k+1} = \text{(fractional part of } 10a_k\text{)}, k = 1, 2, \ldots, \quad (1)$$

where $a_1$ is almost any number between 0 and 1. For example, if it could be verified that the fractional part of $\pi$, 3.14159..., were a suitable number with which to begin the iteration (1), then the first few terms of the infinite sequence of random-like numbers would be:

$a_1 = 0.14159\ldots$
$a_2 = 0.4159\ldots$
$a_3 = 0.159\ldots$

It is clear that if the slide rule illustrated in FIG. 1 possessed no error of measurement, that it could generate an infinite sequence of numbers defined by formula (1). Indeed, under these circumstances, if the zero scale marker 10 of the V-scale could be placed without error opposite the point on the U-scale defined by the fractional part of $\pi$, the slide rule could solve for the numbers just listed that are defined by the iteration formula (1) when $a_1 = $ (fractional part of $\pi$).

A serious difficulty with formula (1) as a guide to the practical generation of random numbers is that relatively few starting values $a_1$ can be found which are both computable and assured random-like results. (Mathematicians cannot determine whether such a well known number as $\pi$, used in the above example, is such that its fractional part is suitable as a starting value $a_1$.) Moreover, though formula (1) can actually be solved on digital machines without error for certain suitable starting values of $a_1$, the results obtained are only pseudo-random.

The physical basis that justifies the incorporation of a measurement process in an iteration scheme for the generation of random numbers is a physical fact concerning precision measuring devices. This fact states that the best design for a measuring device is one such that repeated applications of the measuring device yield independent measurements whose average approaches the exact quantity being measured. This fact states that while measurement cannot be made exact in one operation, a precision measuring device can be designed with which accuracy of measurement can be accomplished statistically through the averaging of many independent operations. Thus, precise physical measurement is potentially a source of purely random components. The fact that the kind of errors which enter in the operation of a precision measuring device can be averaged out to yield an exact measurement, means also that the errors inherent to precision measuring devices are originated solely by chance without influence on the part of the operator of the measuring device and without influence on the part of the physical characteristics of the measuring device, itself.

The physical and mathematical facts combined suggest a design for a class of random number generators whose theory is basically a slight modification of formula (1), which can be built within the limitations of physical measuring devices, and which produce truely random numbers.

Assuming now that we are to attempt the solution of equations (1) with physical apparatus that is subject to error, it is clear that each of the numbers $a_k$ in the formula must be interpreted as mathematically determined quantities plus small errors. If only precision measuring devices, or the equivalent, are involved in the physical realization, then the errors will be of the kind that are determined solely by chance. Although in any precision device care might be exercised to insure that the setting of an indicator, or hairline, be as close to a measurable quantity of $a_k$ as possible, still the actual setting will vary from $a_k$ by the inherent limits of accuracy of the device, itself. Therefore, although it might be desired that the setting of a precision measurement device be equal to $a_k$, in reality it will be some setting in the range $a_k + \delta$, where $\delta$ is equal to the accuracy of the measuring device. To say it another way, the realized value of any physically measurable quantity $a_k$ will be stored in the precision measurement apparatus as $a_k + x_k$, where $x_k$ is an error that is statistically independent of other errors and has a theoretical expected value of zero. Looking back on formula (1), it is seen that a modified form which is consistent with solution by precision devices is:

$$a_{k+1} = (\text{fractional part of } 10(a_k + x_k)), k = 1, 2, ..., (2)$$

where now $a_k$ is any number between 0 and 1 and the $x_k$ are the successive errors that enter at each stage of the iteration due to a precision measuring device.

The fact that formula (2) defines an infinite sequence of random numbers can be proved by the methods of probability theory. In fact, formula (2) is practically superior to formula (1), not only because it can be solved by physically realizable measuring devices and similar devices, but because it leads to random numbers for all starting values $a_1$. The random results obtained from formula (2) will not depend on the starting value $a_1$, if sufficiently many iterations are carried out. Formula (2) defines mathematically the operation of the slide rule illustrated in FIG. 1 and many other embodiments of the immediate invention.

Figure 2:
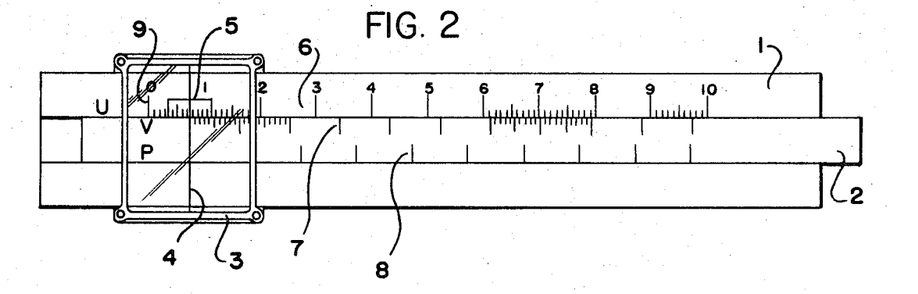
FIGS. 2, 3, and 4 are top elevated views of the slide rule for generating random numbers, the three figures showing in sequence the three basic steps in the generation of random numbers.
Figure 3:
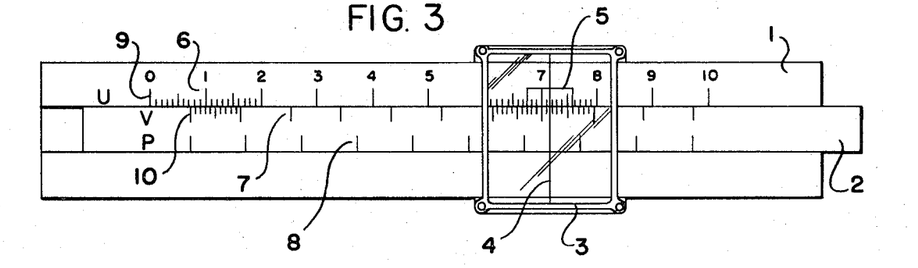
Figure 4:
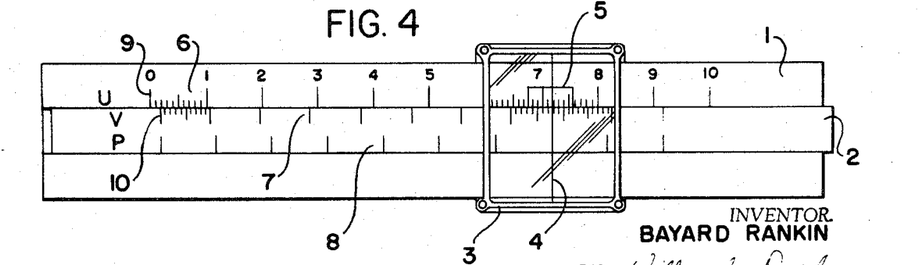

As a detailed example of the operation of the slide rule illustrated in FIG. 1, consider FIGS. 2, 3, and 4, which illustrate a sequence of three basic settings of the slide rule. Let us assume that an initial measurable quantity $a_1$ equal to 0.7178 is to be chosen, where $a_1$ is read in units of the U-scale 6. Now, if the accuracy of reading a number into a slide rule is let us say 0.001 in units of the U-scale, then the value actually read into the slide rule will be accurate to the first three decimal places and, accordingly, the actual $a_1$ will be equal to $0.717e_1e\ldots$, wherein the digits $e_1, e_2, \ldots$ are determined by chance. The reading-in operation is accomplished by moving the zero indicating marker 10 of the V-scale 7 to read as close as possible to 0.7178 on the U-scale 6. The read-in operation is illustrated in FIG. 2. The error due to the read-in is, of course, due to the thickness of the markings, the eye sight of the operator reading the numbers, and to various other factors. After the slide 2 is in a proper setting relative to the body 1, the cursor 3 is moved relative to the now fixedly held slide 2 and body 1 until the position of the hairline 4 over the U-scale 6 records a measurement reading of the displacement of the slide 2 relative to the body 1. The scales are so arranged that a series of operations determines the setting of the cursor so that the position of the hairline 4 is over the U-scale at a point 10 times greater than the displacement of the slide 2 relative to the body 1. A rough setting of the cursor 3 is obtained by moving it until the hairline 4 is over the major numbered scale marker on the U-scale that most nearly coincides with a major scale marker of the V-scale that is advanced beyond the former. A closer and more exact positioning is obtained by moving the cursor in a positive direction until the subdivisional markings of both the U-scale 6 and the V-scale 7 appear to coincide when viewed through the vernier interpolator 5. FIG. 3 illustrates the correct setting of the cursor. A detailed description of methods for reading vernier scales through an optical vernier interpolator is given in my co-pending application, Ser. No. 365,629 now U.S. Pat. No. 3,449,052. If the cursor is positioned correctly, the hairline 4 will be positioned over $7.17d_1d_2 \ldots$, wherein the digits $d_1, d_2, \ldots$ are determined by chance and involve the errors of both read-in and the cursor setting.

The partitioning operation, which has the mathematical effect of extracting and recording the fractional part of $7.17d_1d_2\ldots$, is then carried out by holding the cursor 4 fixed relative to the body 1 and moving the slide 2 until a marker on the P-scale 8 is drawn under hairline 4. The result of this last of three basic operations is illustrated in FIG. 4. Where a choice of markings on the P-scale to be drawn in coincidence with the hairline 4 is presented, that one is to be used which keeps the zero marker of the V-scale 7 within the first one unit interval of the U-scale 6. By moving the scales in this manner, the zero marker 10 of the V-scale 7 is repositioned relative to the U-scale 6 to the fractional part of the position of the hairline 4, that is, to the fractional part of the measurement reading. More specifically, in the example illustrated, the zero marker 10 is moved to indicate $0.17c_1c_2 \ldots$ on the U-scale, where, as before, the digits $c_1, c_2, \ldots$ are determined by chance.

In the above manner, it is seen that not only is the fractional part of a precision measurement reading obtained, but a new measurable quantity has been set up in the slide rule so that an iteration of measurement and partitioning of this new measurable quantity may then be processed. By a repeated series of these three basic operations illustrated in FIGS. 2, 3, and 4, it is seen that relatively soon — and in this case only two or more iterations are necessary — the number as indicated by the positioning of the hairline on the U-scale will be totally made up of error and will be completely random and unbiased in nature.

The slide rule embodiment is only one of many simple machines that solve the iteration formula (2). It happens that the slide rule embodiment requires a human operator. Automatic devices are easily constructed, however, within the spirit of the immediate invention, as a second embodiment will show.

Before discussing the second embodiment, it is important to point out that the only feature of the function $f(a_k + x_k) = 10(a_k + x_k)$ appearing in formula (2) that is essential for the eventual generation of random numbers through iteration is the following: Interpreting the quantity $a_k$ as fixed and the quantity $x_k$ as an error, $f(a_k + x_k)$ has greater statistical error than has $(a_k + x_k)$. If we use $\sigma[z]$ as a symbol for the statistical error of a random quantity $z$, then the essential feature of the function $f$ is expressed with the inequality:

$$\sigma[f(a_k+x_k)] > \sigma[(a_k+x_k)] \quad (3)$$

In particular, if the constant 10 in formula (2), which represents the magnification of the precision measuring device or, equivalently, the multiplication constant of an analogue computing device, is replaced by any integer greater than 1, the inequality (3) will still be satisfied. More generally, if $f(a_k + x_k)$ is any function whose slope in absolute value is everywhere greater than 1, the inequality (3) will still be satisfied, and any such function substituted into equation (2) defines the operation of a random number generating device. Thus, the most general equation that characterizes the immediate invention is the following:

$$a_{k+1} = (\text{fractional part of } f(a_k+x_k)), k=1, 2, \ldots, \quad (4)$$

where now $a_k$ is any number between 0 and 1, the $x_k$ are the successive errors that enter at each stage of the iteration, and the function $f$ statisfies the inequality (3). It should be emphasized that some devices described by formula (4) will produce a sequence of numbers that rapidly display their random properties, while other devices described by the same formula must generate many numbers before randomness is apparent. This variety of behavior is due to the fact that the greater the difference between the two quantities in inequality (3), the more rapid the convergence toward randomness in the numbers produced by the corresponding device. For example, a device described by equation (2) will require fewer iterations in order to generate a quantity that is statistically independent of the initially measured quantity than will a device described by an equation like (2) with the integer 2 replacing the integer 10. Practical considerations determine the extent to which one wishes to satisfy inequality (3) in a particular device. In general, the greater the difference between the two quantities in inequality (3), the more difficult is the device to build which satisfies the inequality.

The operation of the slide rule of FIG. 1 to generate random numbers may be briefly described as follows:

The operator sets an analog quantity in the slide rule by displacing the slide 2 to a position between 0 and 1. The analog quantity which is read into the slide rule is indicated by the scale U and the 0 reference of the scale V. When an analog quantity is set in the slide rule by displacing the 0 mark of the scale V to a position along the scale U, the U scale is not capable of indicating to the operator the analog quantity actually stored in the slide rule. The scale U will indicate the more significant digits of the quantity but the digital number representing the actual setting will be a number where the fine digits, i.e., the digits of least significance, will have chance, i.e., random, values. This is because any read-in for an analog device inherently has an error factor and this error factor necessarily introduces a random quantity as part of the actual analog quantity registered in the device. Consequently, the digital number representing the actual analog quantity registered in the device will have fine digits whose magnitudes are determined by chance.

When the operator moves the optical interpolator along the vernier scale V to multiply the setting registered in the slide rule, the operator will establish the hairline 4 at a position from the reference mark 0 of the U scale which is 10 times greater than the distance of the 0 mark of the scale V from the reference mark 0 of the scale U. This operation then amplifies the original displacement and then stores in the slide rule an analog quantity which is a multiple of the analog quantity stored in the slide rule by the initial displacement. Since the position of the vernier scale V along the U scale is determined by the initial analog setting, the magnitude of product quantity is directly dependent upon the actual magnitude of the quantity which was initially stored.

The multiplication of the initial analog quantity promotes the significance of the digits of digital representation of the initial quantity which was set in the slide rule. This will be appreciated when it is realized that the digit 7 now represents a displacement 7 times as large as that represented by the digit 7 of the initial setting.

Not only have the most significant digits of the initial quantity been promoted in significance, that is, to the next higher order of the decimal number, but the chance digits have also been promoted in significance.

After the multiplying operation, the operator then operates the slide 2 to subtract a quantity represented by the most significant digit, 7 in the case illustrated in FIGS. 1–4, to partition the product quantity and to set the 0 mark of the scale V to the fractional part of the product quantity. Thus, the most significant digit of the original setting, which was clearly biased or selected, has been removed and the chance digits have been promoted one order in significance. Successive operations are performed to remove all of the more significant digits which could be effected by bias of the operator insofar as the initial read-in is concerned.

While the description of the operation has been made without reference to the error factor involved in the successive manipulations, it will be appreciated that such error factor does exist and, in fact, may reduce the number of successive operations which are necessary to produce a completely random number.

Figure 5:
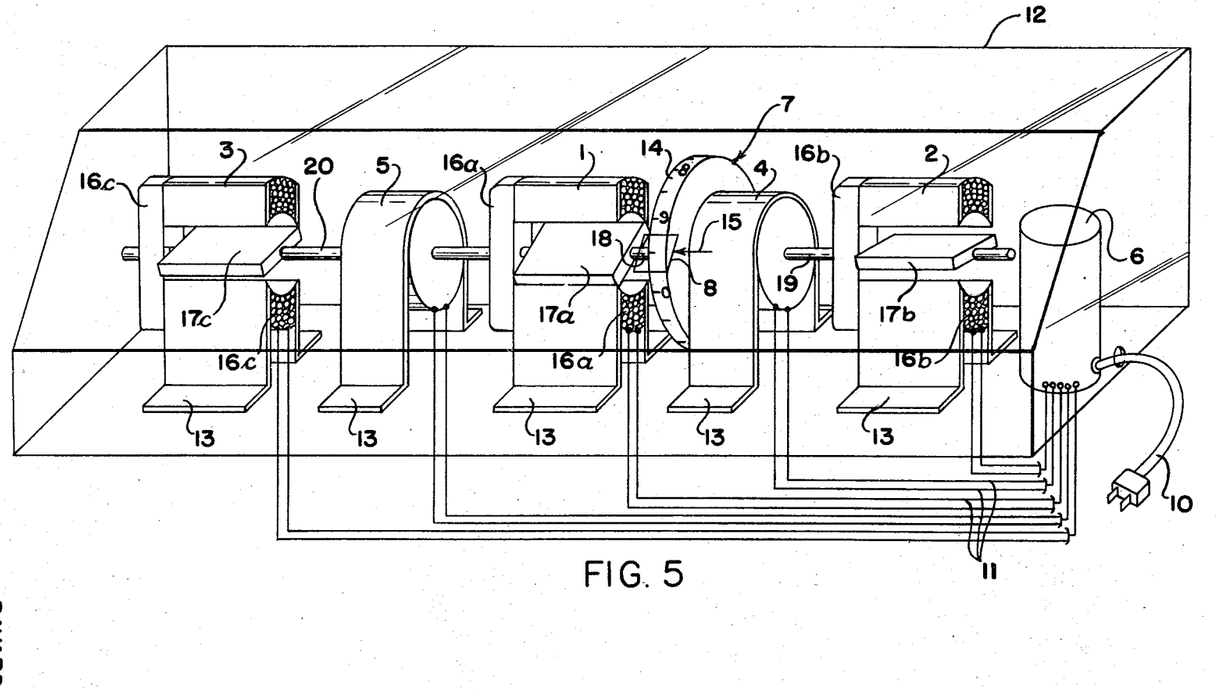
FIG. 5 shows an automatic device for the generation of random numbers composed primarily of electromagnetic positioning devices and clutches arranged in coaxial array.

An alternate embodiment of a random number generator is illustrated in FIG. 5. Again, as in the hereinabove described embodiment, the same major components of precision measuring device and partitioning device are in the system. However, the major components in this embodiment are composed of electromechanical elements and are accompanied by sufficient controls to make the entire system automatic.

Referring to FIG. 5, there is shown a number of electromechanical parts all but one of which are co-axially connected and all mounted in a common box 12. For the sake of demonstration, the box 12 is chosen to be plastic or some equivalent transparent material. Three of the electromechanic components 1, 2, and 3 are of similar construction and can be chosen to be galvanoscopes of the fixed coil and rotating magnet variety. The electrical connections 11 to these galvanoscopes are to bring current into the windings 16a, 16b, 16c and thus cause the rotatable magnets 17a, 17b, 17c to orient themselves in a fixed position with respect to the magnetic field induced by the current in the windings. Two of the electromechanical parts 4 and 5 are identical magnetic clutches and are physically interposed between pairs of galvanoscopes. Galvanoscope 1 has a shaft 18 centrally attached to its rotatable magnet and both extremities of its shaft extend so that connections can be made with clutches 4 and 5. Galvanoscopes 2 and 3 each have similar shafts 19 and 20 and these are connected to magnetic clutches 4 and 5, respectively, so that the entire system of three galvanoscopes and two clutches is co-axially aligned. The frames of all three galvanoscopes 1, 2, and 3 and two clutches 4 and 5 are rigidly positioned through flanges 13 to the base of the box 12. Fixedly attached to one of the shaft extremities of galvanoscope 1 is a wheel 7 on whose rim is inscribed a scale 14. This scale can be read by viewing it through a window 8 cut in the side of the box 12. An electrical sequencing device 6 is also secured inside the box 12 and determines at any one moment which of the electromechanical devices 1, 2, 3, 4, 5 are to be electrically activated by the current carried in to the box by wires 10. The sequencing device 6 can be designed with a constant speed electrical motor connected to commutators and a system of brushes or it can be designed in some other well known way. The bearings of a given galvanoscope are assumed to be quite frictionless but sufficiently firm to prevent movement of its magnet unless the coil is electrically activated or unless the coil of another galvanoscope is electrically activated and the induced motion is transmitted to the given galvanoscope through an electrically activated clutch. Thus, by this arrangement, if both clutches 4 and 5 are electrically activated and if the coil of any one of the three galvanoscopes is activated, the motion of the shaft in the activated galvanoscope will be transmitted mechanically to the shafts of the other galvanoscopes. On the other hand, if no clutches are activated, the motion of the shaft of any one galvanoscope will not be transmitted to that of any other galvanoscope.

While the electromechanical devices 1, 2, 3 have been described as galvanoscopes, it is clear that many electrical rotary devices, if properly wired, can serve the purpose. That is, the function of the electromechanical devices 1, 2, 3 is to hold their central shaft in a fixed angular position as long as no strong torque is present and to respond to a current passing through certain wire windings by rotating the central shaft until one predetermined angular position is achieved. The latter angular position, called the zero position, can be read as one out of 360°. In the case where galvanoscopes are used, or electrical rotary devices in which the stator and the rotor each provide a magnetic dipole, it will happen that the return of the rotor to the zero position, as determined by repulsive magnetic fields, may occur in a clockwise or a counterclockwise direction. The direction of rotation will be determined by the angular state of the rotor and shaft prior to activating the device and will be such that the rotation will encompass less than 180°. This fact is important when determining the performance of the electromechanical devices as components in a random number generating device.

The recording wheel 7 registers the angular state of the shaft of galvanoscope 1. Some function of the angular state can be read by comparing the graduations of the scale 14 with a fixed position in the box in the neighborhood of the window 8. A fixed position is illustrated in FIG. 5 as a marker 15 centrally located with reference to the window 8. It is clear that an automatic read-out device recording an angular state can be substituted for the wheel 7. In the device illustrated in FIG. 5, the scale 14 is graduated to read 0 at the zero position of galvanoscope 1, to read ½ at the point 180° removed, to read approximately 0.99 at the point 356° removed and to return to read 0 at the 360° (or zero) position, and to read linearly between those points in a clockwise direction. (The counterclockwise direction could also be used.)

Whereas the precision measuring device was shown in the first embodiment to measure linear displacements, the alternate embodiment illustrated in FIG. 5 contains a precision measuring device for measuring angular displacements, specifically, angular displacements of the central shaft 18 of galvanoscope 1. While in the first embodiment a measurement reading was recorded as a multiple of ten times the quantity measured, the second embodiment can be interpreted as recording a multiple of two times the quantity measured. That is, an angular displacement of the central shaft of galvanoscope 1 is translated into the equal displacements of the two shafts 19 and 20 of galvanoscopes 2 and 3.

To see how a sequence of generator and clutch operations can result in magnifying an angular displacement by two, we consider the following example: Let clutches 4 and 5 be relaxed and let galvanoscopes 2 and 3 be returned to their zero positions. Let galvanoscope 1 be in an arbitrary angular state less than 180° from the zero position. Such a state can be read on scale 14 as a number between 0 and ½. Let the number be $x$. First activate clutches 4 and 5. While clutches 4 and 5 are engaged, pass current through the windings of galvanoscope 1. Galvanoscope 1 returns to zero state, as could be seen on the scale, and the shafts 19 and 20 of galvanoscopes 2 and 3 are carried $-x$ scale units from their zero positions because of the rigid mechanical linkages between all the shafts. Now relax clutch 5 and stop the current passing through galvanoscope 1. There is now a rigid linkage between galvanoscopes 1 and 2 through clutch 4. Activate galvanoscope 2. This operation returns galvanoscope 2 to its zero state and carries galvanoscope 1 into state $x$, as recorded by scale 14. That is, the shaft of galvanoscope 1 is carried to an angular position that is $x$ scale units removed from its zero position. Now stop the current passing through galvanoscope 2, relax clutch 4, activate clutch 5, and pass a current through the coil of galvanoscope 3. Because of the rigid linkage that now exists between the shafts of galvanoscopes 1 and 3 through clutch 5, the return of the shaft 20 of galvanoscope 3 to its zero position causes galvanoscope 1 to assume angular state $2x$. One reads $2x$ on scale 14. Now by relaxing clutch 5 and stopping the current in galvanoscope 3, the entire system is where it began, except that the wheel 7 is displaced $2x$ rather than $x$ units from the zero position of galvanoscope 1. In a similar way, if galvanoscope 1 is in an arbitrary angular state greater than 180° from the zero position, the state will again be read on scale 14 as a number between 0 and 1. If such a number is $x$, the above described sequence of operations of galvanoscopes and clutches will result in a reading of the fractional part of 2x. The analysis is similar, though not as direct.

It is clear that the only addition to the clutches and galvanoscopes that one needs in order to make the above sequence of operations performed automatically in a sequencing device. Such a device 6, shown in FIG. 5 to be in the same box with the other components, can be one of many devices capable of transmitting a given current to various centers over preassigned periods of time. Thus, galvanoscope 1, rigidly linked through clutches 4 and 5 to the shafts 19 and 20 of galvanoscopes 2 and 3, can serve as a precision device for measuring angular displacements. Such a device senses the angular displacement of the shaft 18 of galvanoscope 1 when the coil of galvanoscope 1 is activated and the device stores the same (though oppositely oriented) displacement on each of two shafts 19 and 20, namely those of galvanoscopes 2 and 3. Clearly, minute errors in the operation of the system will result in a stored measurement reading the sum of whose two components differs from twice the original displacement by a small random quantity.

On the other hand, galvanoscopes 2 and 3, in conjunction with clutches 4 and 5 and the shaft 18 of galvanoscope 1, when properly used, can combine to constitute a partitioning device. Such a device, when started with the shafts 19 and 20 of galvanoscopes 2 and 3 in identical positions, and when sequenced as described, will produce, in the form of a stored angular displacement on the shaft of galvanoscope 1, the fractional part of the measurement reading that is stored on the shafts 19 and 20 of galvanoscopes 2 and 3, that is, the fractional part of the sum of those respective shaft displacements. In the partitioning operation, of course, minute random errors will enter as they do in the measurement operation.

The second embodiment, like the first slide rule form, is constituted of a precision measuring device and a partitioning device with the respective parts of each device so interrelated as to make it possible to measure with the precision measuring device the fractional part of a measurement reading that was stored previously by the partitioning device. Consequently, the identical theoretical analysis of the operations that lead to random numbers is possible for both embodiments.

What I claim is:

1. A method of generating a random digital number comprising establishing an initial measurable analog quantity in an analog device with the quantity having a reproducible and controlled portion and an uncontrolled portion, operating the analog device in dependency upon the magnitude of the initial quantity set therein including the uncontrolled portion of the initial quantity to establish in operational dependency on the initial quantity a second quantity which is larger in magnitude than the initial quantity and wherein the absolute magnitude of the uncontrolled portion is greater than the absolute magnitude of the uncontrolled portion of the initial quantity to thereby promote the significance of the uncontrolled portion in the number representing a digital conversion of the entire quantity, establishing a resultant quantity by removing a portion of the second quantity as established in the device by the preceding step to increase the ratio of the uncontrolled portion of the resultant quantity to the controlled portion of the resultant quantity as compared to the ratio of the uncontrolled and controlled portions of the initial quantity, repeating the above described steps with the resultant quantity constituting the initial quantity of each succeeding step to generate a quantity whose digital conversion is a random number generated in an iterative manner, and reading the digital conversion of the number to obtain a random number.

2. In a method as defined in claim 1, wherein the measurable quantity initially established in said analog device is a displacement from a reference position and in which the amplification of the initial measurable quantity is performed by establishing in dependency on the initial displacement including the uncontrolled quantity a second displacement from the reference position which is a multiplied quantity of the magnitude of the initial displacement.

3. In a method as defined in claim 2, wherein said removing is accomplished by subtracting from the displacement as established by said amplifying of the magnitude of the initial measurable quantity a displacement which corresponds to the displacement represented by the most significant digit of a number representing the conversion of the second quantity.

4. In a method as defined in claim 2 wherein the digital number representing the initial displacement is less than a whole number and the removing operation removes a whole number part of the digital conversion of the second quantity and establishes a displacement which corresponds to the fractional part of the digital conversion.

5. A random digital number generator comprising an analog device having first means for setting the device to indicate a measurable analog quantity which has a controlled portion and a portion which is uncontrolled, digital converting means for indicating the digital conversion of a portion of an analog quantity set in said device but incapable of indicating the uncontrolled portion of the initial quantity established in the analog device, second means for establishing in said analog device in dependency on the initial quantity established therein including the uncontrolled portion a second quantity which in magnitude is an amplification of the initial quantity including the uncontrolled portion to thereby increase in the digital conversion of the second quantity the magnitude of the uncontrolled portion, partitioning means for removing a quantity from the second quantity to increase the ratio of the uncontrolled portion of the resultant quantity to the controlled portion of the resultant quantity, whereby a random number may be generated by repeatedly operating the analog device to establish a quantity whose magnitude is an amplification of the resultant quantity and to partition the latter quantity.

6. A random number generator as defined in claim 5, wherein said digital converting means comprises a body member having linear scale means thereon, and said first means comprises a movable member displaceable from a reference point on said body member to set a measured physical displacement therein, and said second means comprising vernier means and a cursor associated with said members for establishing a second setting along said linear scale means corresponding to a second quantity which is a multiple of the original physical quantity including the uncontrolled portion thereof, and said partitioning means includes scale means associated with said movable member for subtracting a part of the second analog quantity from said setting along said scale means and setting the remaining part in said device.

7. A random number generator as defined in claim 6, wherein said vernier means includes a vernier scale on said movable member, said vernier scale cooperating with said linear scale means and having markings which are spaced apart from each other by distances other than the distance between markings of said linear scale means, said cursor includes an optical vernier interpolator for effecting visual alignment of the markings on said vernier scale and linear scale to thereby establish said second setting.

8. A method of producing a random number comprising the steps of operating part of an indicating means to a condition corresponding to a first number composed of biased and unbiased digits, operating part of said indicating means to a condition corresponding to a second number which is an amplification of said first number, operating part of said indicating means to a condition corresponding to a third number composed of at least one less biased digit than said first number, and repeating the last two steps utilizing the third number as the first number until the effect of operating said indicating means results in an entirely random number formed entirely of unbiased digits and reading the digital conversion of the random number.

9. A method as set forth in claim 8 wherein said indicating means is a slide rule having first and second relatively movable members and a cursor, and said step of operating a part of said indicating means to a condition corresponding to said first number includes the step of sliding said first member relative to said second member until said first member is displaced relative to said second member by a distance corresponding to said first member, said step of operating a part of said indicating means to a condition corresponding to said second number includes a step of moving said cursor relative to said first member to a location along said first scale which is an amplification of said first number, and said step of operating a part of said indicating means to a condition corresponding to said third number includes the step of sliding said first member relative to said second member for a distance corresponding to a portion of said second number to establish a third setting along said first scale.

10. An iterative random number generator comprising first and second relatively slidable members, a cursor body, and an optical vernier interpolator carried by said cursor body, said first member being provided with a first linear scale having a plurality of equally spaced transverse markings along an exposed surface thereof, said second member having a vernier scale inscribed on one of its exposed surfaces adjacent and movable relative to said first linear scale on said first member, said vernier scale comprising a plurality of transverse markings spatially removed from each other by a lesser distance than the spaced interval between successive markings in said first linear scale, said cursor body carrying hairline means as well as said optical vernier interpolator, with said cursor body being slidable relative to said first and second members, said optical interpolator being positionable over the first linear scale and the vernier scale to visually align said scales to provide a precise reading of the relative displacement of the first and second members by positioning the cursor body relative to the first and second slidable members, a second linear scale on an exposed surface of said second relatively slidable member with said hairline carried by said cursor body so as to be positionable over said second linear scale, said second linear scale being composed of ten equally spaced marks, the first of said marks being located at the same longitudinal position as the beginning of the vernier scale and the last of said marks being located at the same longitudinal position as the end of the vernier whereby a measurement reading of the displacement of said first member relative to said second member is stored by the position of said cursor and is partitionable into integrable parts equal to the graduation units of said second linear scale plus a fractional part, said fractional part then being storable as the displacement between initial markings of said two relatively slidable members.

11. The combination as described in claim 10, wherein said vernier scale markings are spatially removed from each other a distance equal to nine-tenths of spatial interval between successive markings of said first linear scale, and said vernier scale extends nine-tenths of total length of said first linear scale.

* * * * *